Nov. 17, 1970       C. W. CHILLSON       3,540,311
FREE-FLOATING PLANETARY TRANSMISSION
Filed Feb. 17, 1969                    6 Sheets-Sheet 2

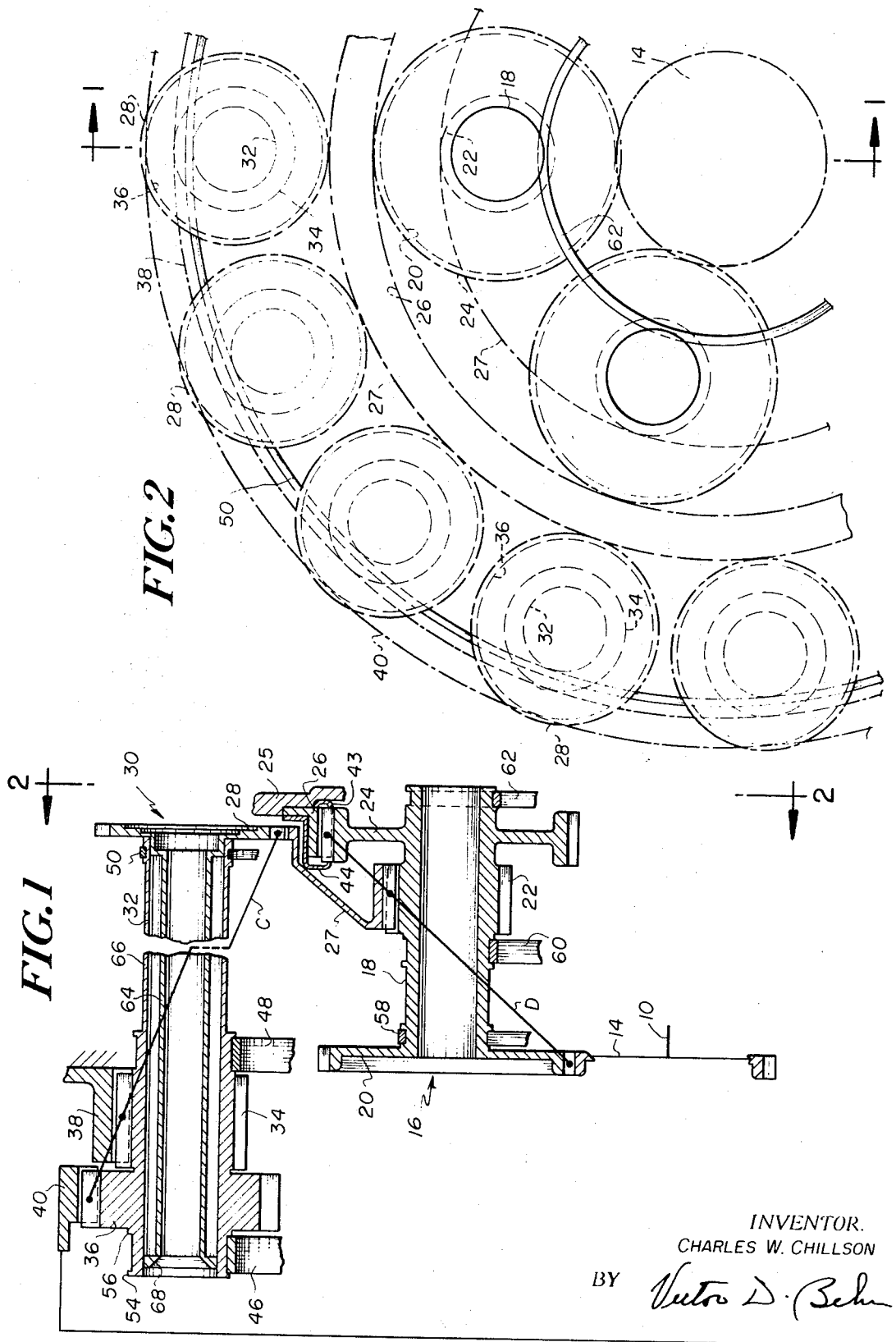

INVENTOR.
CHARLES W. CHILLSON
BY Victor D. Behn
ATTORNEY

INVENTOR.
CHARLES W. CHILLSON

ATTORNEY

Nov. 17, 1970     C. W. CHILLSON     3,540,311

FREE-FLOATING PLANETARY TRANSMISSION

Filed Feb. 17, 1969     6 Sheets-Sheet 6

INVENTOR.
CHARLES W. CHILLSON
BY Victor D. Behn
ATTORNEY

United States Patent Office 3,540,311
Patented Nov. 17, 1970

3,540,311
FREE-FLOATING PLANETARY TRANSMISSION
Charles W. Chillson, Wayne, N.J., assignor to Curtiss-Wright Corporation, a corporation of Delaware
Filed Feb. 17, 1969, Ser. No. 799,868
Int. Cl. F16h *1/28, 57/100*
U.S. Cl. 74—797     25 Claims

ABSTRACT OF THE DISCLOSURE

A light-weight, high speed-ratio reduction transmission having a set of free-floating planetary elements with the transmission load forces on each planetary element being so spaced apart axially that the net moment tending to tilt each planetary element out of its radial plane is substantially zero. A plurality of rings have rolling contact with the planetary elements to constrain said elements against the radial forces acting on said elements.

BACKGROUND OF THE INVENTION

Conventional planetary transmissions comprise a set of planetary elements spaced circumferentially about the transmission axis, these elements being journaled in bearings mounted in a common support structure. In such prior art transmissions, the planetary bearings and support structure have sufficient rigidity to maintain each planetary element in its normal position in a plane, including the axis of said element and the transmission axis. Such a plane for a planetary element is herein termed the "radial plane" for said elements, since this plane extends radially from and includes the transmission axis. U.S. Pat. No. 3,245,279 to S. W. Baker is an example of such a prior art transmission.

In accordance with the present invention, the weight of such prior art transmissions is substantially reduced by using free-floating planetary elements. As used herein, a transmission in which the planetary elements are "free-floating" is one in which said elements are not provided with support bearings which restrain the elements against radial and tilting movements. Such weight reduction is very significant in airplane applications as, for example, for driving the rotors of a helicopter. In addition to elimination of their weight, elimination of these bearings simplifies the transmission, eliminates the normal bearing losses and the life of the transmission is no longer limited by the life of the bearings.

In order to provide high gear reduction ratios, compound planetary elements are used in the present invention. In general, however, the load transmitting forces on a compound planetary element tend to tilt the element out of its normal position in its radial plane. Any such tilting of a planetary element out of its radial plane would result in non-uniform loading across the face of the engaged gear teeth of the planetary element, thereby producing excessive stresses in said teeth.

Such excessive gear tooth stresses in a free-floating planetary element are avoided with the present invention by locating the effective points of application of the transmission load forces on each planetary element in such a manner that the net moment tending to tilt said element out of its radial plane is substantially zero.

The load transmitting forces of a planetary-type transmission comprise an input force, an output force and a reaction force on each planetary element, these forces being perpendicular to the radial plane of said element and therefore directed in a direction tangent to the planetary motion of said element. Hence, the tangential or load transmitting forces acting on each planetary element are the forces tending to tilt each planetary element out of its radial plane. It should be noted, however, that each of these forces may comprise more than one force. For example, each planetary element might have two gears, each meshing with its individual stationary reaction gear. In such case, the total reaction force is a sum of the two reaction forces on said two gears. Likewise, the total input force and the total output force each may comprise the sum of the forces applied to a plurality of input or output members or gears. Hence, as used herein, the "input force," "output force" and "reaction force" acting on a planetary element mean the total of each of such forces, unless such forces are expressly described otherwise.

In addition to said tangential or load transmitting forces, namely, the input, output and reaction forces, each planetary element is subjected to radial forces, namely, the gear tooth separating forces and centrifugal forces. In the free-floating planetary transmission of the present invention, such radial forces are absorbed by axially-spaced floating rings coaxial with the transmission axis and having rolling contact with the planetary elements.

The prior art also includes planetary transmissions characterized by the absence of bearings for the planetary elements, for example, as disclosed by U.S. Pat. No. 3,258,995 to Bennett et al. In this prior art transmission, however, the input and output gears are not axially spaced and, instead, they lie in the same plane, the one being an internal gear and the other an external gear, and both mesh with the same planet gears. In the planetary transmissions of this invention, however, the input, output and reaction forces on a planetary element are axially spaced apart along the element. With this arrangement of the present invention, adjacent planet input gears can readily be arranged to overlap to increase the number of planetary elements and the load capacity of the transmission. For example, the planet gears meshing with an input sun gear can be increased in diameter to increase the transmission speed ratio reductiton and, in order to increase the number of these larger planet gears which can be placed about the sun gear, alternate planet input gears can be axially displaced to permit overlapping of these gears. In the Bennett et al. patent, however, the transmission speed ratio cannot be effectively increased by increasing the diameter of the planet gears meshing with the sun gear, since the output gear also meshes with these planet gears.

SUMMARY

An object of the present invention comprises the provision of a novel and light-weight transmission having free-floating planetary elements in which the load transmitting forces of each planetary element, namely, its input force, its output force and its reaction force, are so axially spaced apart along the axis of said element that the net moment of said forces tending to tilt each planetary element out of its radial plane is substantially zero. Another object of the invention resides in the provision of such a transmission and in which the radial forces acting on each planetary element are constrained by one or more axially-spaced rings coaxial with the transmission axis and having rolling contact with the planetary elements.

In the simplest forms of the invention, each compound planetary element is subjected in effect to but a single input force, a single output force and a single reaction force. In any such form of the invention, it can be shown that the net moment of said forces tending to tilt a planetary element out of its radial plane is substantially zero when the effective lines of action of said forces on said element intersect a straight line which lies in said radial plane and passes through the axis of said element. Accordingly, still another object of the invention resides in the provision of a transmission having free-floating planetary elements in which the effective lines of action of input, reaction and output forces on each planetary element intersect a straight line which lies in the radial plane of said element and passes through the axis of said element. At this point, it should be noted that the lines of action of said forces pass through the centers of their meshing gear teeth faces when said faces are uniformly loaded.

In a first form of the invention, each compound planetary element comprises a spindle having three axially-spaced gears thereon and rotatable with the spindle and to which the input, output and reaction forces on said planetary element are applied. In such an embodiment of the invention, the three gears are axially spaced apart along their spindle so that the effective points of engagement of said gears with their respective meshing gears lie on the aforementioned straight line. In this form of the invention, the straight line passes through the axis of its associated spindle at a point between two of said gears.

In a second form of the invention, either the input or the output force of each planetary element is applied along a tangential line passing at right angles to the axis of its spindle and intersecting the aforementioned straight line. In the illustrated embodiments of this second form of the invention, this intersection is on the axis of the spindle of its planetary element and, therefore, as compared with the first-mentioned form, the portion of the spindle to one side of the point at which said straight line intersects the spindle axis is not required, thereby materially reducing the length of each planetary element. This second form of the invention is subject to at least two variations. First, said input or output force may be applied to each planetary element by a gear journaled on the spindle of said element, means being associated with said gear to impart a planetary motion thereto. In a second variation, said input or output force may be applied to each planetary element by a rolling surface engageable with a cylindrical surface on or within the spindle of said element, such rolling surface being carried by the spindles of a second set of planetary elements.

The invention is also applicable to planetary transmissions having free-floating planetary elements in which each such element is subjected to more than three individual load transmitting forces. In accordance with the invention, in each such transmission, the load transmitting forces for each planetary element are so axially spaced apart along the planetary element that the moment tending to tilt each planetary element out of its radial plane is substantially zero. Two examples of such transmissions are included herein, each having four load transmitting forces acting on each planetary element. Again, as in the simpler three-force forms of the invention, the radial forces on each free-floating planetary element are constrained by floating rings which are coaxial with the transmission axis and have rolling contact with the planetary elements.

Other objects of the invention will become apparent on reading the next detailed description in connection with the drawings.

BRIEF DESCRIPTION OF THE DRAWINGS

FIG. 1 is a schematic view of a two-stage planetary transmission embodying the invention and taken along line 1—1 of FIG. 2;

FIG. 2 is an end view taken along line 2—2 of FIG. 1 in which, for simplicity, only the pitch circles of the gears and only two of the floating rings are illustrated;

DESCRIPTION OF THE PREFERRED EMBODIMENTS

Figures 3, 4:
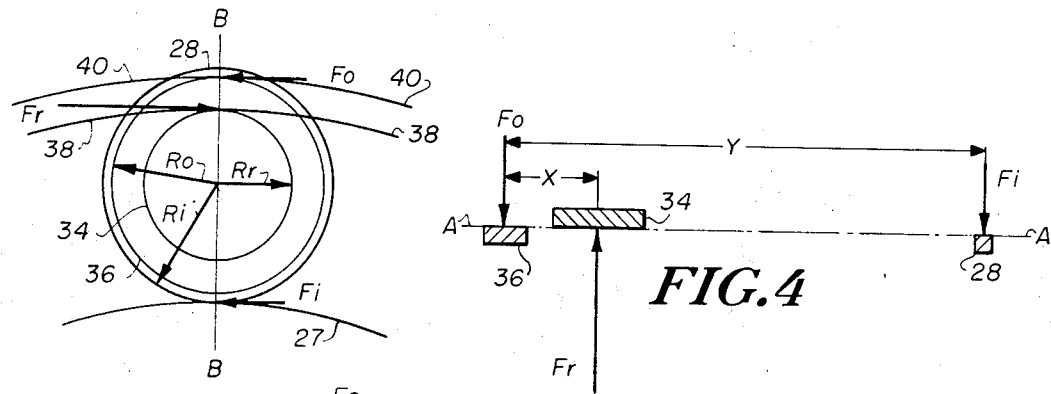
FIG. 3 is an end view showing the pitch circles of the gears of one of the planetary elements of FIGS. 1 and 2 and also showing the load transmitting forces.
FIG. 4 is a diagrammatic view showing the meshing gear teeth of a planetary element projected on a tangential plane, i.e., a plane perpendicular to the radial plane and parallel to the axis of said element.

Reference is first made to FIGS. 1 and 2 of the drawings. These figures show a transmission comprising an input shaft 10 having a sun gear 14. A set of free-floating compound planetary elements 16 of the differential type are spaced circumferentially about the axis of the shaft 10. Each planetary element 16 has a spindle 18 having planet gears 20, 22 and 24 rotatable therewith. As illustrated, the gears 20, 22 and 24 are shown as being integral with their spindle 18 but, if desired, some of these gears may be separately mounted on the spindle as by a spline connection. Gears 20 mesh with the sun gear 14, while gears 24 mesh with an internal fixed gear 26 coaxial with the transmission axis and, for example, secured to a fixed structure 25. The gears 22 of the planetary elements 16 mesh with the internal teeth of a floating ring gear 27, said ring gear also having external teeth meshing with the planet gears 28 of a second set of compound planetary elements 30 of the differential type which are also spaced circumferentially about the axis of the shaft 10.

Each planetary element 30 includes a spindle 32 with which the associated gear 28 is rotatable. Each planetary element 30 also includes planet gears 34 and 36 also rotatable with the spindle 32. The gears 34 mesh with an internal fixed gear 38, while the gears 36 mesh with an internal output gear 40, said internal gears being coaxial with the transmission axis. The output gear 40 is secured to the output shaft 42, said output shaft being coaxial with the input shaft 10.

Means are provided for restraining the free-floating planetary elements 16 and 30 against axial movement. For this purpose, the annular fixed gear 26 is provided with coaxial annular members 43 and 44 secured to opposite sides of the gear, each of these members having an end portion which extends across and engages the end faces of the gear teeth approximately at the pitch circle of the gear. Since the planet gear 24 is in mesh with the fixed gear 26, the annular members 43 and 44 also engage the end faces of the meshing teeth of the gear 24, thereby restraining the planet gear 24 and the entire planetary element 16 against axial movement. Similar means (not shown) may be provided as required to restrain axial movement of the free-floating planetary elements 30 and for restraining axial movement of the free-floating planetary elements of the other embodiments of the invention described herein.

Axially-spaced floating annular rings 46, 48 and 50 are coaxial with the shaft 10 and have rolling engagement with surfaces of the spindle 32. Each of the rings 46, 48 and 50 rolls on each spindle 32 between axially-spaced annular shoulders on the spindles to maintain the desired relative axial position of said rings. For example, the ring 46 is received between shoulders 54 and 56 on each spindle 32.

The rings 46, 48 and 50 serve to restrain the planetary elements 30 against the radial gear tooth separating forces and against the centrifugal forces on said element which occur during operation of the transmission. The centrifugal forces always urge the planetary elements 30 radially outwardly. However, since the planetary gears 34 and 36 mesh with internal gears, the radial component of the forces on their meshing gear teeth urge said planetary gears radially inwardly. On the other hand, since the planetary gears 28 mesh with an external or spur-type gear, the radial component of the forces on their meshing gear teeth urge the planetary gears 28 radially outwardly. In order to absorb this combination of radially inward and radially outward forces acting on the gears of each planetary element 30, the floating rings 46 and 48 have rolling engagement with the radial inner side of the spindles 32 to absorb the radially inward forces, while the other ring 50 has rolling engagement with the outer side of the spindles to absorb the radially outward forces. Obviously, additional or even fewer rings, similar to the rings 46, 48 and 50, may be used as required to restrain each planetary element 30 against the radial forces acting thereon.

Similarly, the set of planetary elements 16 also have floating rings 58, 60 and 62 coaxial with the axis of the transmission and having rolling engagement with the spindles 18 of said elements to restrain said elements against the radial forces acting thereon during operation of the transmission.

The first set of planetary elements 16 provides a first speed-ratio reduction from the shaft 10 to the floating ring gear 27 and the second set of planetary elements 30 provides a further speed-ratio reduction from said gear 27 to the output shaft 42.

Reference is now made particularly to FIGS. 1, 3 and 4. As illustrated in FIG. 1, the gears 28, 34 and 36 of each planetary element 30 are axially spaced along the spindle 32 of said element. The input force $Fi$ on each planetary element 30 is provided by the external teeth on the ring gear 27 meshing with the gear 28 of said element. The output force $Fo$ on each planetary element is provided by the internal gear 40 meshing with the gears 36 of said elements, while the reaction force $Fr$ on each planetary element 30 is provided by the internal fixed gear 38 meshing with the gears 34 of said element.

Each of the three forces $Fi$, $Fo$ and $Fr$ actually comprise the resultants of the pressure distribution across the faces of their respective meshing gear teeth occurring during operation of the transmission. If, as is assumed, this pressure distribution is uniform across the faces of the meshing gear teeth, then each of said resultant forces $Fi$, $Fo$ and $Fr$ acts as if it were concentrated at the center of its gear tooth face. These forces are illustrated in FIGS. 3 and 4. In FIG. 3, these forces are projected on a plane transverse to the transmission axis, while in FIG. 4, these forces are projected on a tangential plane, i.e., a plane perpendicular to the radial plane of the planetary element and parallel to the transmission axis.

FIGS. 3 and 4 are largely diagrammatic views showing said load transmitting forces. In FIG. 3, as in FIG. 2, only the pitch diameters of the gears are illustrated. FIG. 4 is a partial view showing only the meshing gear teeth of a planetary element 30. As illustrated in FIG. 3, the pitch circles of the input gear 28, reaction gear 34 and output gear 36 are shown as having radii $Ri$, $Rr$ and $Ro$, respectively. Also in FIG. 4, the distance X designates the axial separation of the centers of the faces of the teeth of the gears 34 and 36 of the planetary element 30 and the distance Y designates the axial separation of the centers of the gear tooth faces of the gears 36 and 28.

As has been stated, it is an object of this invention to space the gears 28, 34 and 36 axially on the spindle 32 so that the net moment of the load transmitting forces $Fi$, $Fr$ and $Fo$ tending to tilt the associated planetary element out of its radial plane is zero. This means that in FIG. 4 the sum of the moments of the forces $Fi$, $Fo$ and $Fr$ about any point on the line A—A in this figure must be zero. If, for example, the moments are taken about the point of application of the force $Fo$, then we can write the following first equation:

$$FrX - FiY = 0$$

The relative magnitude of the forces $Fi$, $Fo$ and $Fr$ is determined by the relative pitch diameters of the gears of each planetary element 30, as illustrated in FIG. 3, so as to provide the desired speed reduction ratio, and the sum of the moments of these forces about any point lying on the line B—B in FIG. 3 is zero. Therefore, by taking these moments, for example, about the point of application of the force $Fo$ in FIG. 3, we can write the following second equation:

$$Fr(Ro - Rr) - Fi(Ri + Ro) = 0$$

By combining this latter equation with the first equation specified above, we can obtain the following third equation:

$$\frac{Ro - Rr}{X} = \frac{Ri + Ro}{Y}$$

The relative magnitudes of radii $Ri$, $Ro$ and $Rr$ would, of course, be determined in advance so as to provide the desired gear ratio, whereby each of these gear radii are determined as soon as the size of one of these gears is selected. Then, if we arbitrarily select the distance X, said third equation automatically determines the distance Y such that the net amount tending to tilt a planetary element out of its radial plane is zero. Thus, in FIG. 1, the gears 28, 34 and 36 of each planetary element 30 are spaced axially apart so that the distances X and Y have the relative axial spacing determined by said third equation. As a practical matter and as is evident from FIG. 4, the distance X would, of course, have to be selected sufficiently large to permit the faces of the gears 34 and 36 to have the desired widths.

It can be readily seen from the geometry involved that said third equation requires that the gears 28, 34 and 36 of each planetary element 30 be so spaced axially that the centers of their meshing gear teeth faces lie on a straight line C, as shown in FIG. 1. As is apparent, this straight line C lies in the radial plane of its planetary element and passes through the axis of its associated spindle at a point between the gears 28 and 34. This straight line relation can be used for graphically establishing the axial spacing of the points of application of the load transmitting forces along a planetary element so that the moment tending to tilt said element out of its radial plane is substantially zero. This straight line relation, however, only applies to those planetary elements having a three load point configuration, i.e., to planetary elements having a single input force, a single output force and a single reaction force, all axially spaced apart. Thus, as will appear later, this straight line relation does not apply to a planetary element configuration having more than three load points.

Returning now to FIG. 1, it can be seen that the gears 20, 22 and 24 of the planetary element 16 also have been given an axial spacing to achieve this same straight or balance line relation. That is, for each of the planetary elements 16, its gears 20, 22 and 24 are so spaced axially that a straight line D passes through the centers of the meshing gear tooth faces of these gears. Hence, in the embodiment of FIG. 1, the gears of each free-floating planetary elements 16 and 30 are so located axially along their respective spindles that the net moment tending to tilt each of these planetary elements out of its radial plane is substantially zero. In eliminating the usual planetary support structure, such a free-floating planetary element construction has the associated advantage that the spindle axis of each planetary element automatically adjusts its orientation so as to produce a uniform pressure distribution across the faces of its meshing gear teeth. This further advantage can best be understood by reference to FIGS. 5 and 6.

Figure 5:
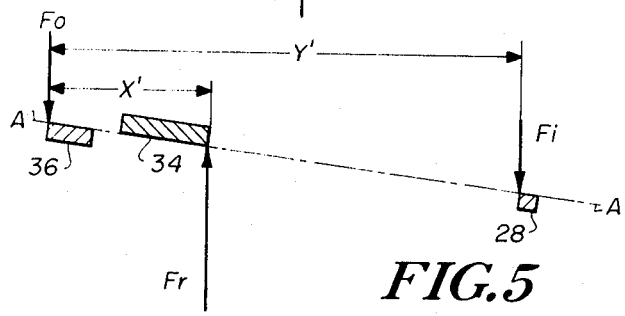
FIGS. 5 and 6 are views similar to FIG. 4 but showing the condition of the planetary gear teeth as a result of clockwise and counter-clockwise tilt, respectively, of their associated planetary element from its radial plane, as viewed looking radially inwardly.

FIG. 5 is similar to FIG. 4 but shows the planetary element 30 tilted or skewed clockwise, as viewed in the drawing, out of its normal position in a radial plane. For purpose of illustration, the magnitude of this tilt is greatly exaggerated in the drawing. Because of this tilt, the forces Fi, Fo and Fr will now be concentrated at the corners of the gear teeth, as illustrated. As a result of this shift of the forces, the X' moment arm has been substantially increased over the corresponding X moment arm of FIG. 4, although the Y' moment arm is substantially the same as the Y moment arm of FIG. 4. Inasmuch as the dimensions X and Y were chosen to make the net moment of the forces Fi, Fo and Fr tending to tilt the planetary element out of its radial plane substantially zero, with this increase in the X dimension to X', these forces will now exert a net counter-clockwise moment tending to restore the planetary element to its normal position in its radial plane.

Figures 4A, 6:
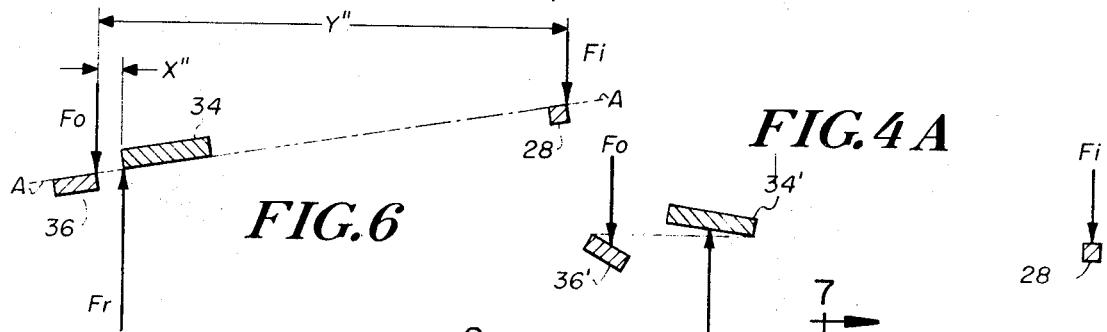
FIG. 4A is a view similar to FIG. 4 but illustrating a modified form of the invention.

FIG. 6 also is similar to FIG. 4 but now the planetary element 30 has been tilted counter-clockwise out of its normal position in a radial plane. Again, because of the tilt, the forces Fi, Fo and Fr are concentrated at the corners of the gear teeth but now at the opposite corners from their condition in FIG. 5. As a result of this concentration of the forces on the opposite corners of the gear teeth, the X'' moment arm is now substantially less than the corresponding X moment arm in FIG. 4 and, again, the Y'' moment arm is substantially the same as the corresponding Y moment arm in FIG. 4. Accordingly, the forces Fi, Fo and Fr now exert a substantial clockwise net moment tending again to restore the planetary element to its original position in a radial plane.

It is apparent, therefore, from FIGS. 5 and 6 that each of the free-floating compound planetary elements 16 and 30 automatically assumes an orientation of its axis so that each of its meshing gear teeth have a substantially uniform load pressure distribution across its face. Because of this fact, the faces of the gear teeth of these planetary elements can be made significantly wider than is possible with non-free-floating planetary elements without danger of non-uniform load pressure distribution across the faces of their meshing gear teeth. Hence, lower gear tooth stresses or, conversely, greater torque capacities, are possible with the free-floating arrangement of the compound planetary elements of the present invention.

Reference is now again made to FIG. 1. As there shown, each spindle 32 consists of a torsionally flexible inner sleeve 64 and an outer sleeve 66 which is relatively rigid. The gear 28 is integral with the adjacent end of the inner sleeve 64 of the spindle and the other end 68 of this inner sleeve is secured to the adjacent end of the outer sleeve 66 as by welding. The ends of the sleeves 64 and 66 of each spindle 32 adjacent to the gear 28 are journaled one on the other to permit small relative rotational movements as a result of torsional twisting of the inner sleeve 64. This torsional flexibility of the connection of each gear 28 of a planetary element 30 to its associated gears 34 and 36 provides for load compensation between the planet gears 28. Thus, if for some reason one of the gears 28 assumed a larger share of the load, as compared to the other gears 28, its torsionally flexible sleeve 64 would torsionally deflect to a greater extent, thereby relieving said gear 28 of a portion of its load. In this way, the torsional flexibility built into the spindles 32 results in the load being divided substantially equally between the gears 28. In the planetary elements 30, the torsional flexibility is incorporated between the input gear 28 and the output gear 40, thereby providing automatic load compensation between said planetary elements. Such load compensation can also be achieved if the torsional flexibility is incorporated between the points of application of any two of the input, output and reaction forces on a planetary element and not just between the input and output forces. A similar torsional flexibility may also be incorporated in the planetary elements 16, as well as in the planetary elements of the other embodiments hereinafter described.

One advantage of applicant's form of free-floating planetary elements is that any axial thrust imposed on the output shaft by the load driven by the shaft can readily be balanced by the use of helical gears, thereby eliminating or minimizing the need for axial thrust bearings. Such an axial thrust would, for example, be imposed on the output shaft if the transmission were used for driving the rotor blades of a helicopter. Thus, in the embodiment of FIGS. 1 and 2, such axial thrust on the output shaft could, for example, be balanced by making the planet gears 36 and the meshing output gear 40 helical. The resulting axial thrust on the planetary elements 30 is balanced by also making the planet gears 34 and fixed reaction gear 38 helical and of the same hand as the helical gears 36 and 40. This modification of the planetary elements 30 is illustrated in FIG. 4A, in which the helical planet gears corresponding to the gears 34 and 36 are designated by reference numerals 34' and 36', respectively.

Figures 7, 8:
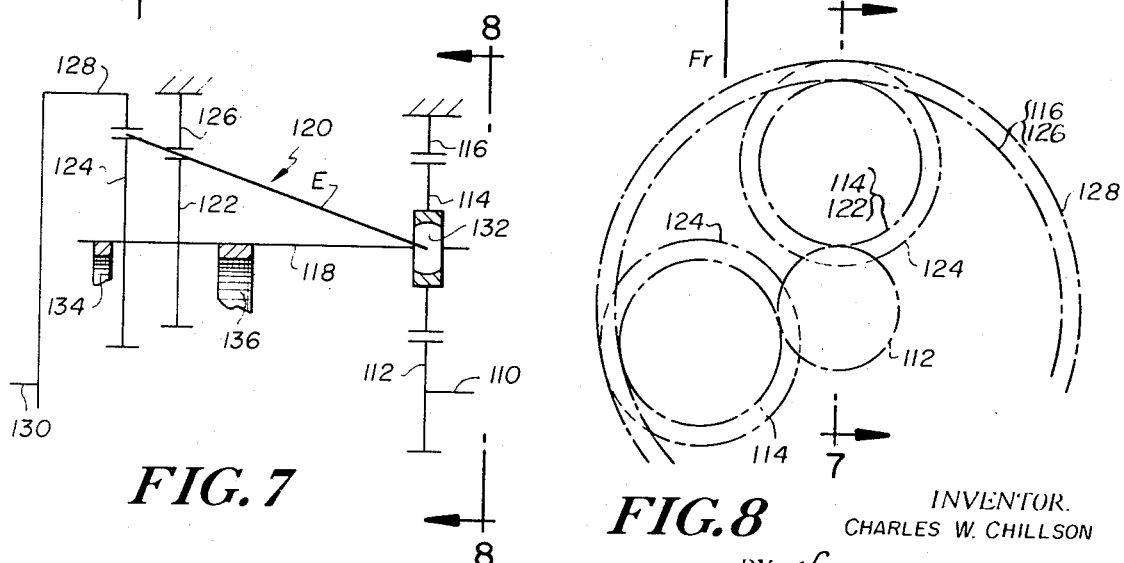
FIG. 7 is a schematic view of a modified form of planetary transmission embodying the invention taken along line 7—7 of FIG. 8.
FIG. 8 is an end view taken along line 8—8 of FIG. 7 showing only the pitch circles of the gears.

Reference is now made to FIGS. 7 and 8 which illustrate another form of transmission embodying the invention. This transmission comprises an input shaft 110 having a sun gear 112. A plurality of planet gears 114 are spaced circumferentially about and are disposed in meshing engagement with the sun gear 112. The planet gears 114 are also disposed in meshing engagement with a fixed internal gear 116.

Each planet gear 114 is journaled on the spindle 118 of a compound planetary element 120 of the differential type. The planetary elements 120 are spaced circumferentially about the transmission axis and, in addition to the spindle 118, each planetary element 120 also includes a pair of axially-spaced planet gears 122 and 124 rotatable with the spindle 118. The gears 122 are disposed in meshing engagement with a fixed internal ring gear 126 and the gears 124 are disposed in meshing engagement with an internal ring gear 128 which is secured to the output shaft 130, said internal gears 126 and 128 being coaxial with the transmission axis. Axially-spaced floating rings 134 and 136 are disposed in rolling contact with the spindles 118 of the planetary elements 120 to restrain said elements against the radial forces acting thereon, these rings being coaxial with the transmission axis.

As already stated, each gear 114 is journaled on the spindle 118 of a planetary element 120. As schematically illustrated in FIG. 7, a spherical bearing 132 is provided between each gear 114 and its associated spindle 118 in order that the gear 114 does not restrict the orientation of the axis of its associated spindle 118 and also in order to accommodate for manufacturing tolerances and deflections.

With the foregoing construction of FIGS. 7 and 8, the input force from the input shaft sun gear 112 is transmitted to the planet gears 114. As a result of their reaction with the fixed internal gear 116, the gears 114 are forced to planetize about the transmission axis, whereby each planet gear 114, through its spherical bearing 132, exerts a tangential input force on its associated spindle 118 of a planetary element 120. The line of action of this input force substantially passes through and intersects the axis of its spindle 118 at the center of the bearing 132 and is directed substantially at right angles to the radial plane of its associated planetary element 120. The other load transmitting forces on each planetary element 120 are the output force exerted on the gear 124 by the internal output gear 128 and the reaction force exerted on the gear 122 by the internal fixed reaction gear 126.

The gears 122 and 124 and the bearing 132 of each planetary element 120 are spaced axially along its spindle 118 so that the net moment of the input, output and reaction forces acting on said element and tending to tilt said element out of its radial plane is substantially zero. The actual relative axial spacing of the points of application of the input, output and reaction forces on each planetary element 120 is determined in substantially the same way as was done in connection with the planetary element 30 in FIGS. 3 and 4 in order that said tilting moment on said planetary element is zero.

As was shown in connection with FIGS. 3 and 4, if the points of application of the net input, output and reaction forces on a compound planetary element 30 have the axial spacing such that these points lie on a straight line in the radial plane of said planetary element, then the net moment of said forces tending to tilt said planetary element out of its radial plane is substantially zero. In a similar manner, it can be shown that for the moment tending to tilt a planetary element 120 out of its radial plane to be zero, the axial spacing between the point of application of the net input force (through the center of the bearing 132), the point of application of the net reaction force (through the center of the face of the meshing teeth of the gear 122) and the point of application of the net output force (through the center of the face of the meshing teeth of the gear 124) should be such that these points all lie on a straight line which, in turn, lies in the radial plane of said planetary element. As illustrated in FIG. 7, these points lie on the straight line E and, therefore, said tilting moment on each planetary element 120 is substantially zero.

A comparison of FIGS. 1 and 7 reveals that the straight line E of FIG. 7 corresponds to the straight line C of FIG. 1, but that in FIG. 7 one side of the straight line E terminates on the axis of its associated spindle 118, while in FIG. 1 the corresponding end of the straight line C intersects the axis of its spindle 32 and, in addition, extends therebeyond to the gear 28. It is apparent, therefore, that the two-gear and bearing construction of the planetary elements 120 of FIG. 7 results in a substantially shortened planetary element, compared with the three-gear construction of the planetary elements 30 of FIG. 1. Thus, the portion of each spindle 32 to the right of the point of intersection of the line C with the spindle axis in FIG. 1 is substantially eliminated by the construction of FIG. 7.

Since the spherical bearings 132 do not restrict the orientation of the axis of their respective spindles, each planetary element 120 automatically assumes a position in which there is a substantial uniform pressure distribution across the faces of its meshing gear teeth. This is so for essentially the same reasons that were discussed in connection with FIGS. 5 and 6 for the planetary elements 30.

Greater speed reduction may, for example, be obtained in the embodiment of FIGS. 7 and 8 by interposing a set of planetary elements between the sun gear 112 and the planetary elements 120 in a manner similar to FIG. 1 in which the planetary elements 16 are interposed between the sun gear 14 and the planetary elements 30.

As illustrated in FIGS. 7 and 8, the fixed internal gear 116 and the fixed internal gear 126 have the same pitch diameter. With this arrangement, there then is no relative rotation between the gear 114 and its spindle 118, whereby friction losses at the bearing 132 of said gear are minimal. Of course, because of manufacturing tolerances, the instantaneous effective pitch circles of the internal gears 116 and 126 on which the planet gears 114 and 122 respectively roll would not be exactly the same and, therefore, in any actual transmission there will be some small relative oscillation between each planet gear 114 and its spindle 118. It is not essential to the invention, however, that the internal gears 116 and 126 have the same pitch diameter. Thus, in order to achieve the desired over-all speed-ratio reduction, said internal gears may have different pitch diameters, in which case there will be relative rotation between the spindle portion 132 and the gear 114.

Figure 9:
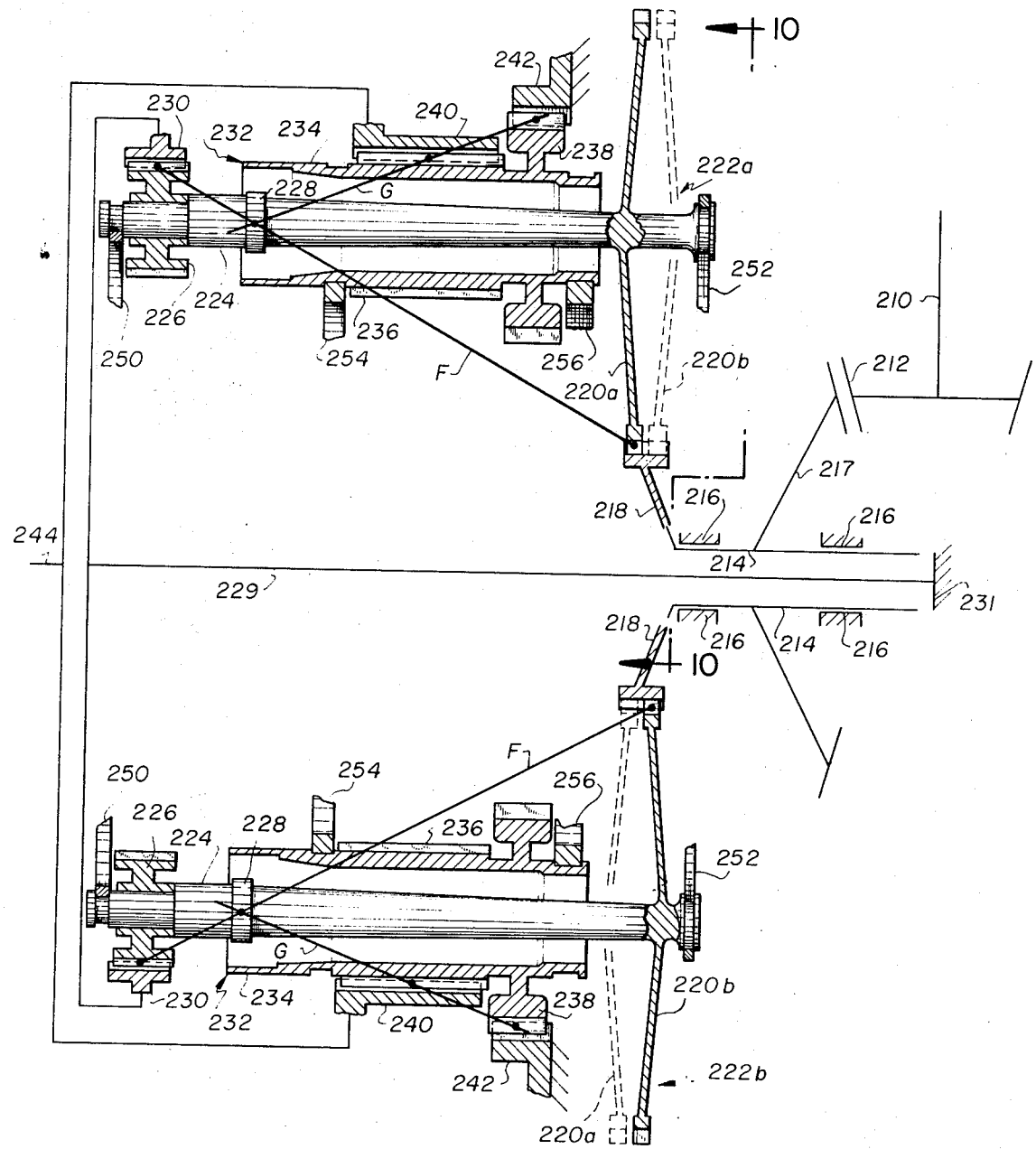
FIG. 9 is a schematic view of a further modified form of a planetary transmission embodying the invention taken along line 9—9 of FIG. 10.

Attention is now directed to FIGS. 9-12 which show another transmission embodiment of the invention. FIG. 9 shows a drive shaft 210 to which a bevel gear 212 is secured. A hollow shaft 214 supported on bearings 216 is disposed at an angle to the drive shaft 210 and has a bevel gear 217 meshing with the bevel gear 212 so as to be driven thereby. The hollow shaft 214 functions as the input shaft of a free-floating planetary transmission embodying the invention.

Figure 10:
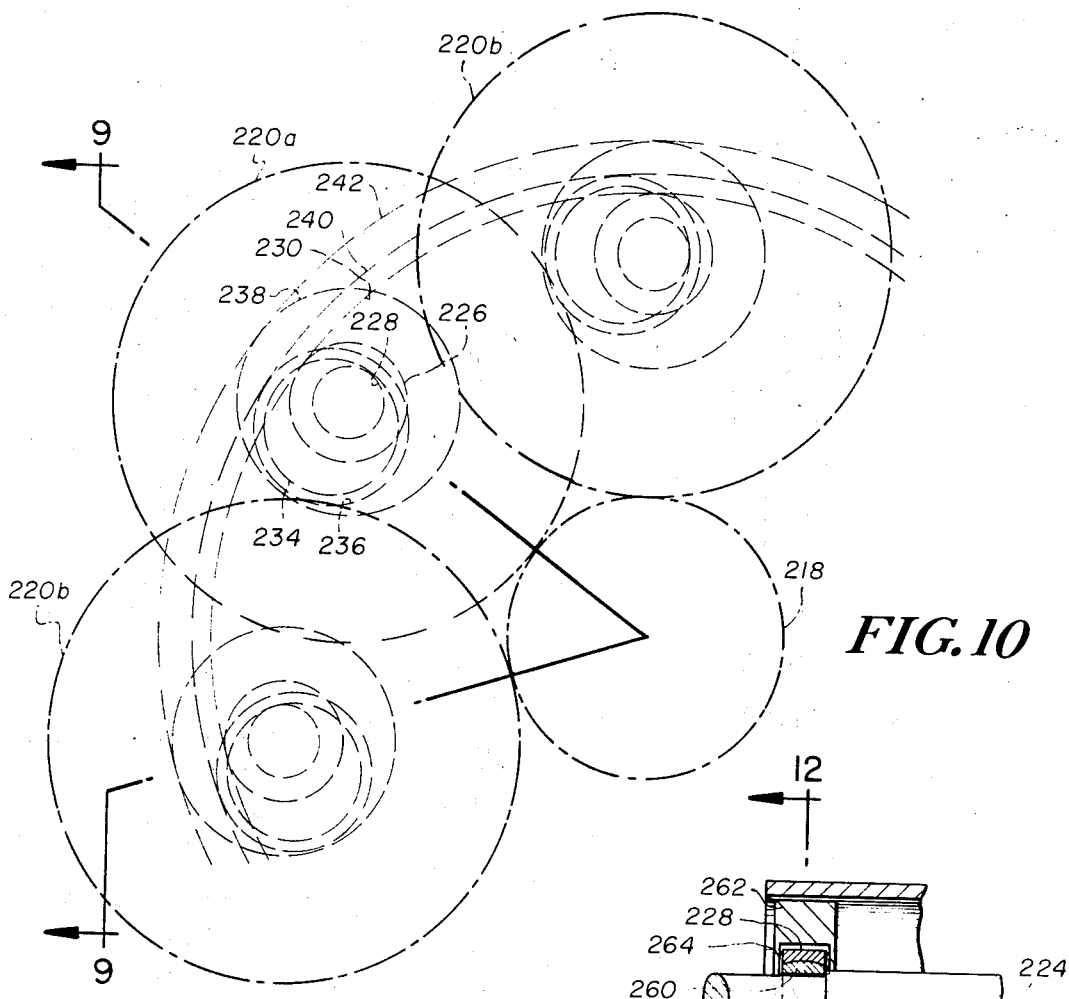
FIG. 10 is an end view taken along line 10—10 of FIG. 9 showing only the pitch circles of the gears.

The hollow shaft 214 has a sun gear 218 meshing with a plurality of planet gears 220a and 220b which are circumferentially spaced about the axis of the transmission shaft 214. As illustrated in FIGS. 9 and 10, the planet gears 220a and 220b are alternatively disposed and are axially spaced so as to permit these gears to overlap circumferentially. The gears 220a are planet gears of planetary elements 222a which are spaced circumferentially about the transmission axis and the gears 220b form part of similar planetary elements 222b disposed between the planetary elements 222a so that the elements 222a and 222b alternate around the transmission axis. The planetary elements 222a and 222b together in effect constitute a set of planetary elements providing an initial speed-ratio reduction from the sun gear 218.

Each compound planetary element 222a includes a spindle 224 to which one of the gears 220a is secured for rotation and includes a second planet gear 226 also secured to the spindle 224 for rotation therewith. As illustrated, the pair of gears 220a and 226 of each planetary element 222a are disposed at opposite ends of their spindle 224. In addition, each spindle 224 has a roller or rolling surface 228 between its gears 220a and 226. Each compound planetary element 222b is similar to the planetary elements 222a in that it also includes a spindle 224 with gears 220b and 226 secured at opposite ends of the spindle and with a roller or rolling surface 228 on the spindle between its said gears.

The gears 226 of the planetary elements 222a and 222b are disposed in meshing engagement with a fixed internal gear 230 coaxial with the transmission axis. As is schematically illustrated, the ring gear 230 is connected to a fixed structure 231 by a connection 229 extending through the hollow input shaft 214.

Figure 12:
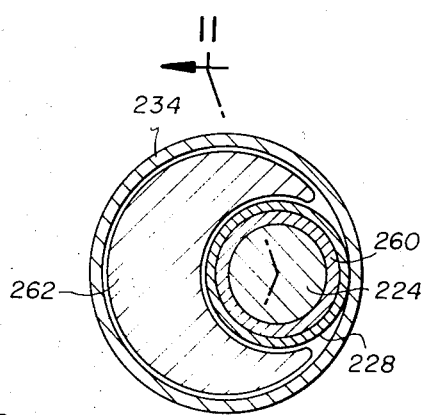
FIG. 12 is a sectional view taken along line 12—12 of FIG. 11.

The transmission also includes a second set of compound planetary elements 232 of the differential type also spaced circumferentially about the transmission axis. Each planetary element 232 includes a hollow spindle 234 through which a spindle 224 of a planetary element 222a or 222b extends. The axes of associated spindles 224 and 234 are displaced circumferentially relative to each other in order that the roller 228 on a spindle 224 is in contact with the inner surface of the associated hollow spindle 234, as best seen in FIGS. 10 and 12, so that the inside of the hollow spindle constitutes an inner rolling surface. As seen in these latter two figures, the rollers 228 have an outer diameter which is substantially smaller than the internal diameter of the hollow spindles 234.

Each planetary element 232 also has gears 236 and 238 secured to a spindle for rotation therewith. The planetary gears 236 are disposed in meshing engagement with an internal output gear 240 and the gear 238 is disposed in meshing engagement with a fixed internal gear 242. The internal gears 240 and 242 are coaxial with the transmission axis, and the gear 240 is connected to an output shaft 244 also coaxial with said axis.

The first set of compound planetary elements 222a and 222b provide a first speed-ratio reduction from the input shaft 214 and its sun gear 218 to the planetary motion imparted to their spindles 224. This planetary motion of the spindles 224 is, in turn, imparted to the hollow spindles 234 of the second set of planetary elements 232 by the rollers 228. Thus, each roller 228 imparts a load transmitting input force to its associated hollow spindle 234 of a planetary element 232 and said hollow spindle, in turn, through a roller 228, imparts an equal and opposite output force on the associated planetary element 222a or 222b.

The relative diameters of the roller or rolling surface 228 and inner surface of the hollow spindles 234 preferably are so chosen that the motion between said surfaces is substantially pure rolling. For this purpose, the ratio of the diameter of each roller 228 to the diameter of the surface of the spindle 234 engaged by the roller should be equal to the fraction whose numerator is the product of the pitch diameters of the gears 226 and 242 and whose denominator is the product of the pitch diameters of the gears 238 and 230.

As illustrated, gears 220a and 226 and roller 228 of each planetary element 222a are so spaced axially along their associated spindle 224 that the point of application of the input force on the gear 220a, the reaction force on the gear 226 and the output force through the center of the roller 228 lie on a straight line F which, in turn, lies in a radial plane of said planetary element. The spacing of the gears 220b, 226 and roller 228 of each planetary element 222b is similar so that a straight line F also passes through the points of application of said forces on this element. Since the gears 220b are displaced axially to the right of the gears 220a, the gears 226 for the planetary elements 222b theoretically should be displaced axially to the left of the positions of the gears 226 for the planetary elements 222a so as to provide this same balance of straight line relation for the points of application of the load transmitting forces on the planetary elements 222b. In an actual transmission design, however, this theoretical displacement between the two sets of gears 226 amounted to less than one-sixteenth of an inch and therefore has not been illustrated on the drawing.

As described in connection with the embodiment of FIGS. 1 and 2, when a compound planetary element is subjected to a single input force, a single output force and a single reaction force, and the points of application of said three load transmitting forces are axially spaced apart along the axis of said planetary element so said points of application lie on a straight line, then the net moment tending to tilt each said planetary element out of its radial plane is substantially zero. Hence, with the spacing of the gears 220a and 220b and 226 and rollers 228 being such as to provide the straight line relation F, the net moment tending to tilt each planetary element 222a and 222b out of its radial plane is substantially zero.

Each pair of planetary gears 236 and 238 and their associated roller 228 are also so spaced axially along the spindle 234 of their planetary element 232 that the effective point of application of the input force on said planetary element (applied by the roller 228 along a line passing through the center of the axis of its spindle 234), the point of application of the output force on its gear 236 and the point of application of the reaction force on its gear 238 all lie on a straight line G which, in turn, lies in the radial plane of said planetary element 232. Accordingly, here again, the spacing of the gears 236 and 238 and roller 228 along the hollow spindle 234 of a planetary element 232 is such that the net moment tending to tilt said planetary element out of its radial plane is substantially zero. At this point, it should be noted that the line of action of the input force applied by the roller 228, although illustrated as passing through the axis of its associated hollow spindle 234, need not do so.

As in the previous modifications described, appropriate floating rings 250 and 252 are provided for the floating compound planetary elements 222a and 222b and, similarly, floating rings 254 and 256 are provided for the planetary elements 232 to restrain said planetary elements against the radial forces acting thereon, said rings being in rolling contact with the spindles of said planetary elements and being coaxial with the transmission axis.

In the embodiment of FIGS. 9 and 10, the compound planetary elements 232 are of the differential type and, therefore, there is an increment of power loss in these elements as a result of the recirculating load through these elements as is inherent in differential-type planetary elements. The compound planetary elements of each of the previously described embodiments are also of the differential type. It is desirable, therefore, in these previously described embodiments, as well as in FIGS. 9 and 10, to provide for most of the speed-ratio reduction in an initial stage where the torque loads are relatively low. Furthermore, in FIGS. 9 and 10, the initial speed reduction stage, as provided by the planetary elements 222a and 222b, is not of the differential type. This then, is an added reason for taking most of the speed-ratio reduction in this initial stage of FIGS. 9 and 10 as is done by making the planet gears 220a and 220b large in diameter, compared to the diameter of the sun gear 218 and gears 226.

In the modification of FIGS. 9–12, each spindle 224 of a planetary element 222a or 222b of the first set extends through the hollow spindle 234 of a planetary element of the second set. Each spindle 224 preferably has sufficient torsional flexibility to provide load equalization between the gears 220a or 220b, as in the case of the spindles 32 of FIG. 1, as provided by their sleeve sections 64. Also, the two gears 226 and 220a or 220b of each planetary element 222a or 222b of the first set are disposed beyond opposite ends of the associated hollow spindle 234 of a planetary element 232 of a second set. It is obvious, however, that the spindles 224, instead of extending completely through the hollow spindles 234, each spindle 224 may simply extend into a hollow spindle 234 for locating its roller 228 therein with both of its gears 226 and 220a or 220b being disposed beyond the roller end of said hollow spindle 234. Also, instead of the spindles 234 being hollow to receive the spindles 224, this construction obviously could be reversed. Thus, the spindles 224 could be hollow with the spindles 234 extending therein and having roller means thereon for rolling engagement with the interior of said hollow spindles.

Figure 11:
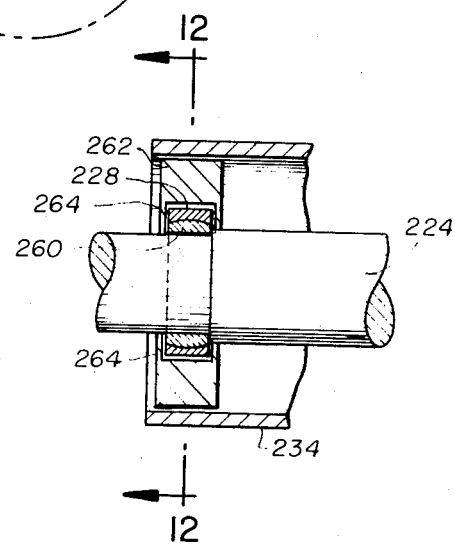
FIG. 11 is an enlarged view, partly in section, of a portion of FIG. 9 taken along line 11—11 of FIG. 12.

As illustrated in FIGS. 11 and 12, each roller 228 preferably is supported on its spindle 224 by a bearing 260 to accommodate deflections and manufacturing tolerances, and the bearing is made spherical to permit each roller 228 to maintain its plane of rotation at a right angle to the cylindrical inner surface of the hollow spindle 234 engaged by the roller. The spherical bearing 260 thereby prevents the roller 228 from engaging the hollow spindle 234 only at one of its corners, instead of across its entire outer surface. Also, as illustrated in these figures, a crescent-shaped filler block 262 preferably is loosely fitted around the side of each roller 228 diametrically opposite to its point of rolling contact with the hollow spindle 234 to fill the space between said roller and the remote inner side of the hollow spindle. The purpose of the filler blocks 262 is to minimize backlash between each roller 228 and its hollow spindle 234 should the output shaft 244 tend to overrun momentarily. As shown in FIG. 11, each block 262 has side flanges 264 which loosely overlap the sides of its roller 228 to maintain the block in position.

In each of the modifications described, each free-floating compound planetary element is subject to three axially-spaced load transmitting forces; namely, an input force, an output force and a reaction force. As described in connection with the embodiment of FIG. 1, in such a three-force construction, the net moment tending to tilt each free-floating planetary element out of its radial plane is substantially zero when the effective points of application of said forces on said element lie on a straight line. A free-floating planetary element of this invention, however, may have more than three load transmitting forces. For example, each such planetary element may have two axially-spaced reaction gears or may have two axially-spaced output gears, whereby each such planetary element would be subject to four load transmitting forces. The points of application of these four load transmitting forces, however, can likewise be axially spaced along their respective planetary elements so that the net moment tending to tilt each such planetary element out of its radial plane is substantially zero if the load division between these gears is suitably controlled. Hence, the straight line relation for spacing the points of application of the load transmitting forces on a planetary element so as to achieve a zero tilting moment on said element is a special result applicable only to free-floating compound planetary elements subject to but three load transmitting forces.

Figure 13:
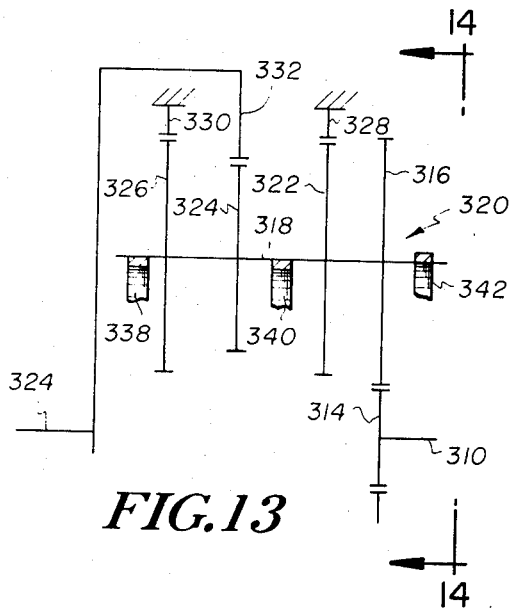
FIG. 13 is a diagrammatic view of a further embodiment of the invention taken along line 13—13 of FIG. 14.
Figure 14:
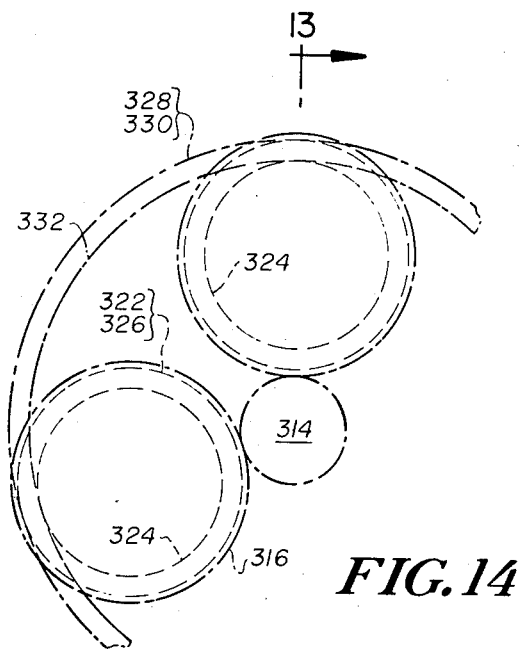
FIG. 14 is an end view taken along line 14—14 of FIG. 13 showing only the pitch circles of the gears.

Reference is now made to FIGS. 13 and 14 which show another embodiment of the transmission invention in which the reaction gear for each planetary element is divided into two axially-spaced gears, whereby said planetary element is subjected to four load transmitting forces.

The transmission of FIGS. 13 and 14 comprises an input shaft 310 and having a sun gear 314. The sun gear 314 meshes with a plurality of planetary gears 316 circumferentially-spaced about the sun gear. Each gear 316 is secured to a spindle 318 of a compound planetary element 320 for rotation therewith. In addition to the gear 316, each planetary element includes planet gears 322, 324 and 326, all secured to the spindle 318 of said planetary element for rotation therewith. As illustrated, the gears 316, 322, 324 and 326 of each planetary element are axially spaced apart along the spindle 318 of said planetary element. The gears 322 and 326 are of the same pitch diameter and they are disposed in mesh with fixed internal gears 328 and 330, respectively, while the gears 324 are disposed in mesh with an internal output gear 332. The output gear 332 is connected to an output shaft 334, said output shaft being coaxial with the input shaft 310. As in the other modifications, suitable floating rings such as 338, 340 and 342 are provided to restrain the planetary elements 320 against the radial forces acting thereon. For this purpose, said rings are coaxial with the transmission axis and are disposed in rolling contact with the spindles 318, the rings 338 and 340 as illustrated contacting the radially inner sides of the spindles, while the ring 342 contacts the radially outer side of the spindles.

With this construction of FIGS. 13 and 14, the planetary elements 320 provide a speed-ratio reduction from the sun gear 314 to the output gear 332. If desired, this transmission may also include an initial speed-ratio reduction between the input shaft sun gear 314 and the planetary elements 320, for example, as in the embodiments of FIG. 1, 7 or 9. Also, the fixed internal gear 330 may be connected to a fixed structure through a hollow input shaft substantially in the manner illustrated for the fixed gear 230 in FIG. 9.

Figure 15:
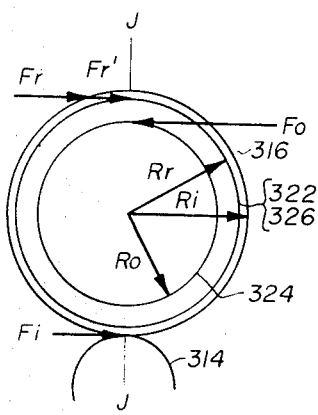
FIGS. 15 and 16 are views corresponding to FIGS. 3 and 4, respectively, but applied to the embodiment of FIGS. 13 and 14.
Figure 16:
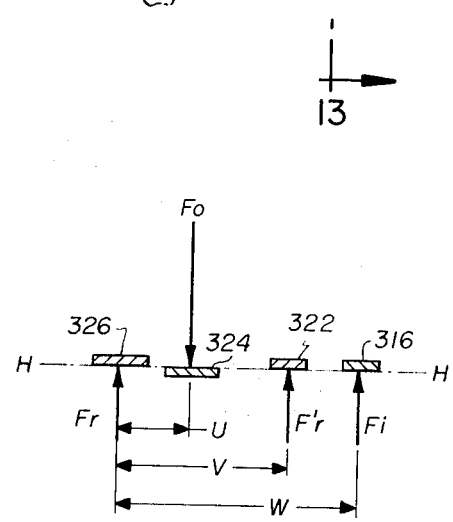

Reference is now made to FIGS. 15 and 16 which show the load transmitting forces on a planetary element 320 in a manner similar to the showing in FIGS. 3 and 4. Thus, in FIG. 15 the load transmitting forces are projected on a transverse plane, and in FIG. 16 these forces are projected on a tangential plane. As in FIGS. 3 and 4, $Fi$ designates the input force on the input planetary gear 316 and $Fo$ designates the output force on the output planetary gear 324, but now the reaction force is divided into a primary reaction force $Fr$ and an auxiliary reaction force $F'r$ where $Fr$ is the reaction force on the gear 326 and $F'r$ is the reaction force on the gear 322.

As in the case of the other embodiments of the invention, the load transmitting forces acting on each planetary element 320 are to be spaced axially along the spindle 318 of said element so that the net moment tending to tilt said planetary element out of its radial plane is substantially zero. Hence, the sum of the moments of the load transmitting forces about any point on the line H—H in FIG. 16 must be zero. If the moments are taken about the point of application of the force $Fr$, then we can write the following equation:

$$FoU = F'rV + FiW$$

where U, V and W are the distances measured along the line H—H of the point of application of the force $Fr$ from the points of application of the forces $Fo$, $F'r$ and $Fi$, respectively.

Also, as in the other embodiments, the relative magnitudes of the forces $Fi$, $Fo$ and the total reaction force $(Fr+F'r)$ are determined by the relative pitch diameters of the gears of each planetary element 320 so as to provide the desired gear ratio reduction, and the sum of the moments of these forces about any point on the line J—J in FIG. 15 is zero. Therefore, by taking these moments, for example, about the point of application of the two reaction forces $Fr$ and $F'r$ in FIG. 15, we can write the following equation:

$$Fo(Rr - Ro) = Fi(Ri + Rr)$$

where $Ri$, $Ro$ and $Rr$ are the radii of the pitch circles of the gears 316, 324, 326 (and 322), respectively. Now, by substituting the value of $Fo$ obtained from this latter equation in the previous equation, we obtain the following equation:

$$Fi\left(U\frac{Ri+Rr}{Rr-Ro} - W\right) = F'rV$$

In order to axially space the load transmitting forces along the spindle 318 of each planetary element 320 for zero tilting moment of said forces in the radial plane of said planetary element, we must establish the division of the total reaction force $(Fr+F'r)$ between the two planetary gears 322 and 326, that is, between the forces $Fr$ and $F'r$. If, for example, we make the auxiliary reaction force $F'r$ equal to $Fi$, then the division of the reaction load between the reaction forces $Fr$ and $F'r$ is determined, inasmuch as the algebraic sum of the load transmitting forces $Fi$, $Fo$, $Fr$ and $F'r$ necessarily equal zero. With $F'r$ being made equal to $Fi$, the above equation then becomes:

$$U\frac{Ri+Rr}{Rr-Ro} - W = V$$

The relative magnitudes of the gear radii $Ri$, $Rr$ and $Ro$ would, of course, be determined in advance so as to provide the speed-ratio reduction desired, so that as soon as the size of one of these gears is selected each of these radii is determined. Now if, for example, the distances U and V are selected, then the distance V is determined by the last-mentioned equation. That is, the distances U, V and W, representing the axial spacing of the gears 316, 322, 324 and 326 are selected to satisfy this equation and, therefore, the moment tending to tilt each planetary element 320 out of its radial plane will be substantially zero. Although the last equation determines the axial spacing of the four load transmitting forces for said zero tilting moment on the planetary elements 320, this axial spacing does not result in a straight line relation as in the case with planetary elements of a three load point configuration, such as in the previously described embodiments of the invention.

Figure 17:
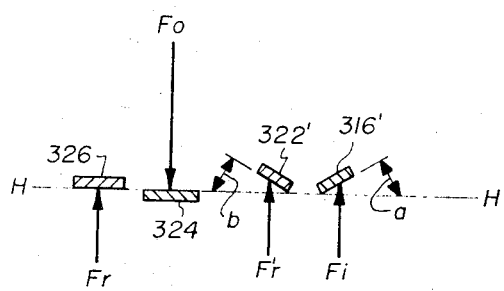
FIG. 17 is a view similar to FIG. 16 but showing a specific means for dividing the reaction load forces.

In deriving the foregoing relation between the distances U, V and W, we have assumed F'r to be equal to Fi. This relation can be accomplished if, for example, the gears 316 and 322, instead of being provided with spur gear teeth, as shown in FIG. 16, are provided with helical teeth 316' and 322', respectively. As shown in FIG. 17, the helix angles $a$ and $b$ of the teeth 316' and 322' are equal in magnitude and of the same hand. The helical gear teeth 316' and 322' appear to be of opposite hand in FIG. 17 because the gear 316 meshes with an external gear 314, whereas the gear 322 meshes with an internal gear 328. This use of helical gear teeth causes each planetary element 320 to shift slightly axially until the axial component of the input load force Fi balances the axial component of the auxiliary reaction force F'r. Hence, this arrangement of FIG. 17, in which the gears 316 and 322 are provided with helical teeth, as illustrated, ensures that the auxiliary reaction force F'r is always equal to the input load force Fi.

Obviously, by proper choice of the relative magnitudes of the angles $a$ and $b$ in FIG. 17, the ratio of the forces F'r and Fi can have any desired magnitude. There are, of course, other ways of determining the division of the reaction load between the gears 322 and 326. For example, these gears 322 and 326 themselves may have helical teeth of opposite hand, with the gear 316, like the gear 324, now being a straight spur gear. Other combinations obviously are possible for determining the division of the reaction load between the gears 322 and 326.

A comparison of FIG. 1 with FIG. 13 clearly shows that by adding the secondary reaction force F'r to the embodiment of FIG. 13, the axial length of each planetary element can be substantially reduced. Thus, in FIG. 13, if the gear 322 were eliminated, the gear 316 would have to be shifted far to the right in order that a balance line, corresponding to line C of FIG. 1, would pass through the points of application of the load forces Fr, Fo and Fi.

Figure 18:
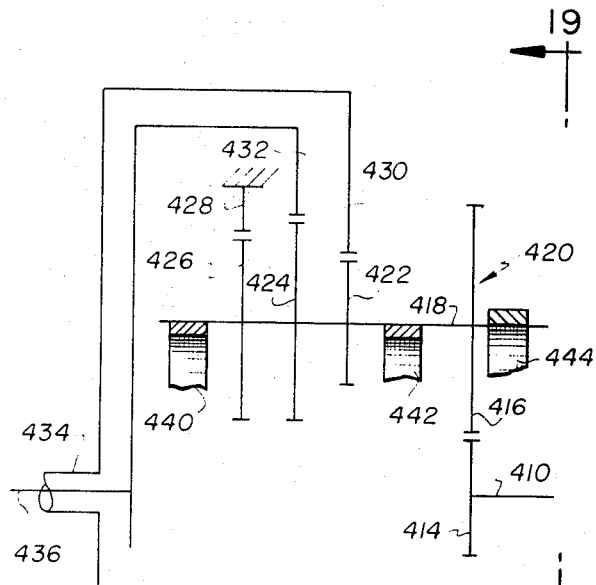
FIG. 18 is a diagrammatic view of still another embodiment of the invention taken along line 18—18 of FIG. 19.
Figure 19:
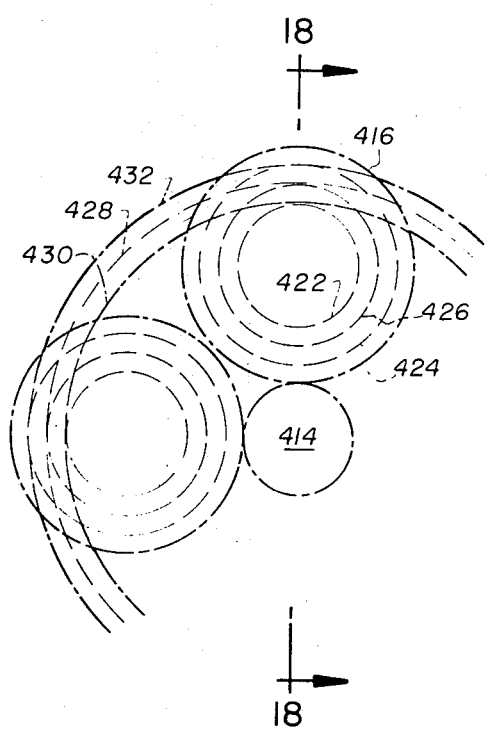
FIG. 19 is an end view taken along line 19—19 of FIG. 18 and showing only the pitch circles of the gears.

FIGS. 18 and 19 illustrate another embodiment of the invention in which each planetary element includes four planet gears. This embodiment is designed to provide two output shafts of opposite rotation. As illustrated, the transmission comprises an input shaft 410 having a sun gear 414. The sun gear meshes with a plurality of planet gears 416 spaced circumferentially about the sun gear. Each planet gear 416 is secured to a spindle 418 of a compound planetary element 420 for rotation therewith. In addition to the gear 416, each compound planetary element includes planet gears 422, 424 and 426, all secured to the spindle 418 of said planetary element for rotation therewith. As illustrated, the four planet gears 416, 422, 424 and 426 of each planetary element are axially spaced apart along their spindle 418.

Each of the planet gears 426 meshes with a fixed internal gear 428 to provide a reaction force on each planetary element. Each planet gear 422 meshes with an internal output gear 430 having a diameter smaller than that of the fixed internal gear 428 and each planet gear 424 meshes with an internal output gear 432 having a diameter larger than that of the fixed internal gear 428. The output gears 430 and 432 are connected respectively to output shafts 434 and 436 coaxial with the input shaft 410. As illustrated, the output shaft 434 is hollow and the other output shaft 436 extends coaxially therethrough.

As in the other modifications, suitable floating rings 440, 442 and 444 are provided to restrain the planetary elements 420 against the radial forces acting thereon. For this purpose, these rings are coaxial with the transmission axis and are disposed in rolling contact with the spindles 418. As typically illustrated, the rings 440 and 442 contact the radially inner sides of the spindles 418 and the ring 444 contacts the radially outer side of said spindles.

With this construction of FIGS. 18 and 19, the planetary elements 420 provide a speed-ratio reduction to the output gears 430 and 432. In addition, since the output gear 432 is larger than the fixed internal gear 428 and the other output gear 430 is smaller than said fixed gear, the two output gears are driven in opposite rotative directions. Preferably, the relative diameters of the two output gears 430 and 432 to that of the fixed internal gear 428 are chosen so that the output gears have equal rotative speeds, although they rotate in opposite directions. This embodiment of the transmission is particularly suitable for driving the contra-rotating coaxial rotors of a dual rotation helicopter.

Here, again, the fixed internal gear 428 can be connected to a fixed structure through a hollow input shaft 410 substantially in the manner illustrated for the fixed gear 230 in FIG. 9.

As in the other embodiments of the invention, the planet gears 416, 422, 424 and 426 are axially spaced apart along the spindles 418 of the planetary elements such that the moment exerted by the load transmitting forces on each planetary element tending to tilt said element out of its radial plane is substantially zero. The actual axial spacing of said planet gears can be determined much in the same manner as in the other embodiments, particularly as in the case of the embodiment of FIGS. 13 and 14. For this purpose, reference is now made to FIGS. 20 and 21 which show the load transmitting forces in a transverse plane and in a tangential plane, respectively. In these figures, Fi, Fo, Fr and F'o represent the load transmitting forces on the four gears of each planetary element. Fi being the input force on the gear 416, Fo being the output force on the gear 422, Fr being the reaction force on the gear 426, and F'o being the output force on the gear 424. Also, Ri, Ro, Rr, R'o and Rs are the radii of the pitch circles of the gears 416, 422, 426, 424 and 414, respectively, and R, S and T represent the axial distances from the center of the tooth faces of the gear 426 to that of the gears 424, 422 and 416, respectively.

Figure 21:
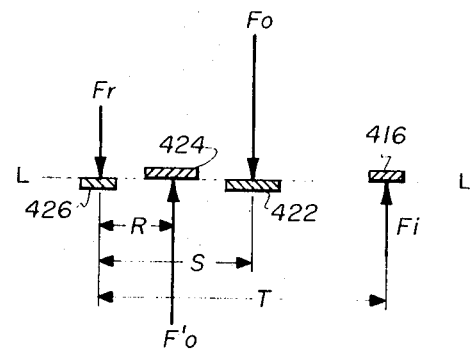

Now, since the tilting moment on each planetary element 420 is to be zero, the moments of the load transmitting forces about any point on the line L—L in FIG. 21 must be zero. Therefore, by taking these moments, for example, about the point of application of the force, Fr, we can write the following equation:

$$FiT = FoS - F'oR$$

Figure 20:
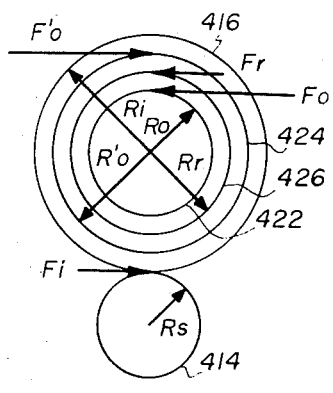
FIGS. 20 and 21 are views corresponding to FIGS. 3 and 4, respectively, but applied to the embodiment of FIGS. 18 and 19.

Likewise, in FIG. 20, by taking moments about the point of application of the force Fr, we can write the following equation:

$$Fi(Ri+Rr) = Fo(Rr-Ro) + F'o(R'o-Rr)$$

Also, if the output torques transmitted by the gears 430 and 432 are to be equal, as would be the case in a dual rotation helicopter drive, then we can also write the following equation:

$$F'o(R'o+Ri+Rs) = Fo(Ro+Ri+Rs)$$

From these three equations, we can obtain the following result:

$$\frac{S-R}{T} = Rr - Ro + (R'o - Rr)\frac{R'o+Ri+Rs}{Ro+Ri+Rs}$$

Now, if, for example, distances R and S between the gears 426 and 424 and between the gears 426 and 422, respectively, are selected, then the distance T between the gears 426 and 416 is determined by this last equation, such that the moment tending to tilt each planetary element 420 out of its radial plane would be substantially zero.

The above discussion of the axial spacing of the planet gears 416, 422, 424 and 426 of each planetary element 420 assumes equal speeds and torques at each of the two output gears 430 and 432. As already mentioned, this embodiment of the invention is particularly applicable for driving the rotors of a dual rotation helicopter. In such an application, as a result of differences in the pitch settings between the two sets of helicopter rotor blades, for example, in order to change the aircraft's direction, the torques on the two output gears may differ. At such times, significant tilting of the planetary elements will be prevented by temporary non-uniform tooth loading on the faces of its meshing gear teeth. Although the resulting increase in gear tooth stresses of course will require adequate limitation of the horsepower rating of the transmission, it will not prevent satisfactory operation if the magnitude and duration of the torque unbalance are not excessive and adequate gear tooth strength is provided.

By suitable variation of the relative radii of the pitch circles of the planet gears of each planetary element 420, it is also possible to provide any desired differences in the speeds or torques of the two output gears 430 and 432. It is clear, however, that in this situation, as in the other embodiments, by proper axial spacing of the planet gears of each planetary element, it is possible to make the moment tending to tilt the planetary element out of its radial plane substantially zero.

It should be understood that this invention is not limited to specific details of construction and arrangement thereof herein illustrated, and that changes and modifications may occur to one skilled in the art without departing from the spirit or scope of the invention.

What is claimed is:

1. A transmission comprising:
    (a) a set of free-floating planetary elements spaced circumferentially about the transmission axis and each having a spindle disposed parallel to said axis;
    (b) mechanism associated with each said spindle to subject its planetary element to input, reaction and output forces, all disposed perpendicular to the radial plane of said planetary element, said mechanism comprising:
        (i) first means including a gear rotatable with the spindle to subject the planetary element to said reaction force,
        (ii) second means including a gear axially spaced from the first means and rotatable with the spindle to subject the planetary element to one of the two remaining of said three forces, and
        (iii) third means axially spaced from said first and second means and co-acting with the spindle to subject the planetary element to the remaining of said three forces, said first, second and third means of each planetary element being so spaced apart along the spindle axis of said element that the net moment exerted by the forces tending to tilt said planetary element out of its radial plane is substantially zero.

2. A transmission as recited in claim 1 and including one or more rings coaxial with the transmission axis and disposed in rolling contact with said planetary elements to constrain said elements against radial forces acting thereon.

3. A transmission as recited in claim 1 and in which each planetary element includes means to provide torsional flexibility between at least certain of the gears rotatable with its spindle.

4. A transmission as recited in claim 1 and in which the effective lines of action of said three forces on each planetary element are spaced apart along the axis of said element so as to intersect a straight line which passes through the axis of the spindle of said planetary element and lies in the radial plane of said element.

5. A transmission as recited in claim 4 and in which each said third means also includes a gear, and further in which the three gears of said first, second and third means of each planetary element are rotatable with the spindle of said planetary element.

6. A transmission as recited in claim 5 and in which the spindle for each planetary element includes a torsionally flexible portion to permit limited relative rotation between at least two of the gears of said element.

7. A transmission as recited in claim 4 and in which each said third means comprises a gear journaled on the spindle of its planetary element and in which the transmission includes a fixed gear disposed in meshing engagement with said last-mentioned gears of the planetary elements.

8. A transmission as recited in claim 7 and including a bearing between each spindle and the gear journaled thereon with said bearing being constructed to permit tilting of the spindle axis relative to said gear.

9. A transmission as recited in claim 7 and in which the first gear of each planetary element and the gear journaled on the spindle of said element have the same pitch diameter to minimize relative rotation between each said spindle and the gear journaled thereon.

10. A transmission a recited in claim 1 and including a helical output gear and in which the gear included in the second means of each planetary element is a helical gear disposed in mesh with said helical output gear, and further in which the gear included in the first means of each planetary element is also a helical gear with the helical teeth of said two helical gears of each planetary element being so oriented that the axial components of the forces on said two helical gears oppose each other.

11. A transmission as recited in claim 1 and in which said third means of each planetary element comprises rolling means having rolling contact with a surface of its associated spindle and in which the transmission includes means for imparting a planetary motion to each said rolling means about the transmission axis.

12. A transmission as recited in claim 11 and in which the relative diameters of each said rolling means and the spindle inner surface engaged thereby are such as to provide substantially pure rolling therebetween.

13. A transmission as recited in claim 11 and in which at least a portion of each said spindle is hollow to provide an annular interior surface coaxial with the spindle and each said rolling means has rolling contact with said annular surface of its associated spindle.

14. A transmission as recited in claim 13 and including a filler member disposed between each said roller means and the annular interior surface of the associated hollow spindle, each said filler member being disposed diametrically opposite to the point of rolling contact between its associated roller means and annular spindle surface to minimize backlash therebetween.

15. A transmission as recited in claim 11 and in which said last-mentioned means comprises a second set of planetary elements, each having a spindle extending into the hollow of a spindle of a planetary element of the first set and in which each said rolling means is carried by and is rotatable with a spindle of said second set.

16. A transmission as recited in claim 15 and including a bearing between each roller means and the spindle on which it is carried to permit rotation of the rolling means about the axis of said spindle.

17. A transmission as recited in claim 16 and in which each said bearing for a rolling means is constructed to permit tilting of the axis of rotation of the rolling means relative to the spindle on which it is carried.

18. A transmission as recited in claim 1 in which one of said first, second and third means includes a pair of gears axially spaced apart and axially spaced from each of the other of said means.

19. A transmission as recited in claim 1 and in which said first means, in addition to the gear already specified as included therein, includes a second gear, said two gears being of the same pitch diameter and being axially spaced apart from each other and from said second and third means.

20. A transmission as recited in claim 19 and in which said third means of each planetary element also includes a gear axially spaced from the two gears of the first means and the gear of the second means of said planetary element.

21. A transmission as recited in claim 20 and in which means are included to determine the division of the total reaction force between the two gears included in the first means of each planetary element.

22. A transmission as recited in claim 20 and in which on of the two gears of the first means of each planetary element and one of the other gears of said planetary element are helical, with their helical teeth being oriented so that the axial components of the forces on the meshing teeth of said two helical gears oppose each other.

23. A transmission as recited in claim 1 and in which said second means subjects the planetary element to said output force and in which said second means, in addition to the gear already specified as included therein, includes a second gear, said two gears being axially spaced apart from each other and from said first and third means, with one of said gears having larger pitch diameter and the other having a smaller pitch diameter than the gear included in said first means.

24. A transmission as recited in claim 23 and including a pair of output gears coaxial with the transmission axis with one of said output gears meshing with one of the gears of the second means of each planetary element and with the other of said output gears meshing with the other gear of said second means and with the pitch diameters of said gears being such that said pair of output gears rotate at equal rotative speeds but in opposite rotative directions.

25. A transmission as recited in claim 23 and in which said third means of each planetary element also includes a gear axially spaced from the two gears of the second means and the gear of the first means of said planetary element.

References Cited

UNITED STATES PATENTS

| 2,414,134 | 1/1947 | Bartlett | 74—410 X |
| 2,700,311 | 1/1955 | Bade | 74—674 |
| 3,307,433 | 3/1967 | Bennett et al. | 74—801 |

LEONARD H. GERIN, Primary Examiner

U.S. Cl. X.R.

74—410